Nov. 18, 1969   K. R. HANCHETT   3,478,615
DAMPER TO PREVENT GEAR CLASH IN A COUNTERSHAFT TRANSMISSION
Filed May 2, 1968   3 Sheets-Sheet 1

INVENTOR.
Kenneth R. Hanchett
BY
A.M. Heiter
ATTORNEY

Nov. 18, 1969 K. R. HANCHETT 3,478,615
DAMPER TO PREVENT GEAR CLASH IN A COUNTERSHAFT TRANSMISSION
Filed May 2, 1968 3 Sheets-Sheet 2

INVENTOR.
Kenneth R. Hanchett
BY
a.m. Neiter
ATTORNEY

INVENTOR.
Kenneth R. Hanchett
BY
a.m. Heiter
ATTORNEY

United States Patent Office 3,478,615
Patented Nov. 18, 1969

3,478,615
DAMPER TO PREVENT GEAR CLASH IN A COUNTERSHAFT TRANSMISSION
Kenneth R. Hanchett, Bloomfield Hills, Mich., assignor to General Motors Corporation, Detroit, Mich., a corporation of Delaware
Filed May 2, 1968, Ser. No. 726,168
Int. Cl. F16h 3/38, 55/14
U.S. Cl. 74—339    5 Claims

ABSTRACT OF THE DISCLOSURE

A damper comprised of a resilient nonmetallic gear is bonded to a steel ring which is secured to the one-two shift collar of a countershaft transmission which collar rotates with the output shaft. Adjacent the damper, on the one-two shift collar is an external reverse gear which engages the reverse idler gear, during a downshift from second speed to first speed forward. During the downshift, the damper silently engages the reverse idler gear to cause it to rotate at the same speed as the external reverse gear so that the two reverse gears may be engaged with no perceptible metal to metal gear clash.

---

This invention relates to the elimination of gear clash in compact countershaft transmissions and more particularly to the elimination of gear clash in transmissions in which an inactive idler gear is engaged by a driven gear during a ratio change.

The invention is illustrated in a countershaft type synchromesh transmission providing four forward ratios and a reverse ratio. The damper is secured to the one-two shift collar adjacent the external reverse gear. The one-two shift collar is moved right or left to establish first or second drive ratio in the transmission. To obtain compactness in the transmission, the reverse gear train is so located between the first and second speed gear sets that during a second to first downshift, the external reverse gear engages the reverse idler gear which is freely rotatable on its support. To prevent gear clash, between the external reverse gear and the reverse idler gear during the second to first downshift, the damper, due to its composition, silently engages the reverse idler and causes it to rotate at the same speed as the external reverse gear before the two gears are engaged.

It is an object of this invention to provide, in a countershaft transmission, a damper to prevent gear clash between unloaded gears which are engaged during a ratio change.

Another object of this invention is to provide, in a countershaft transmission having first and forward speed gear sets and a reverse speed gear set, a damper, located between the first and second forward speed gear sets, which initially engages one gear in the reverse gear set thereby causing it to rotate at the same speed as another gear in the reverse gear set so that the two gears of the reverse gear set can be placed in mesh without gear clash.

These and other objects of the invention will be more apparent from the following description and drawing of the preferred embodiment.

Figure 1:
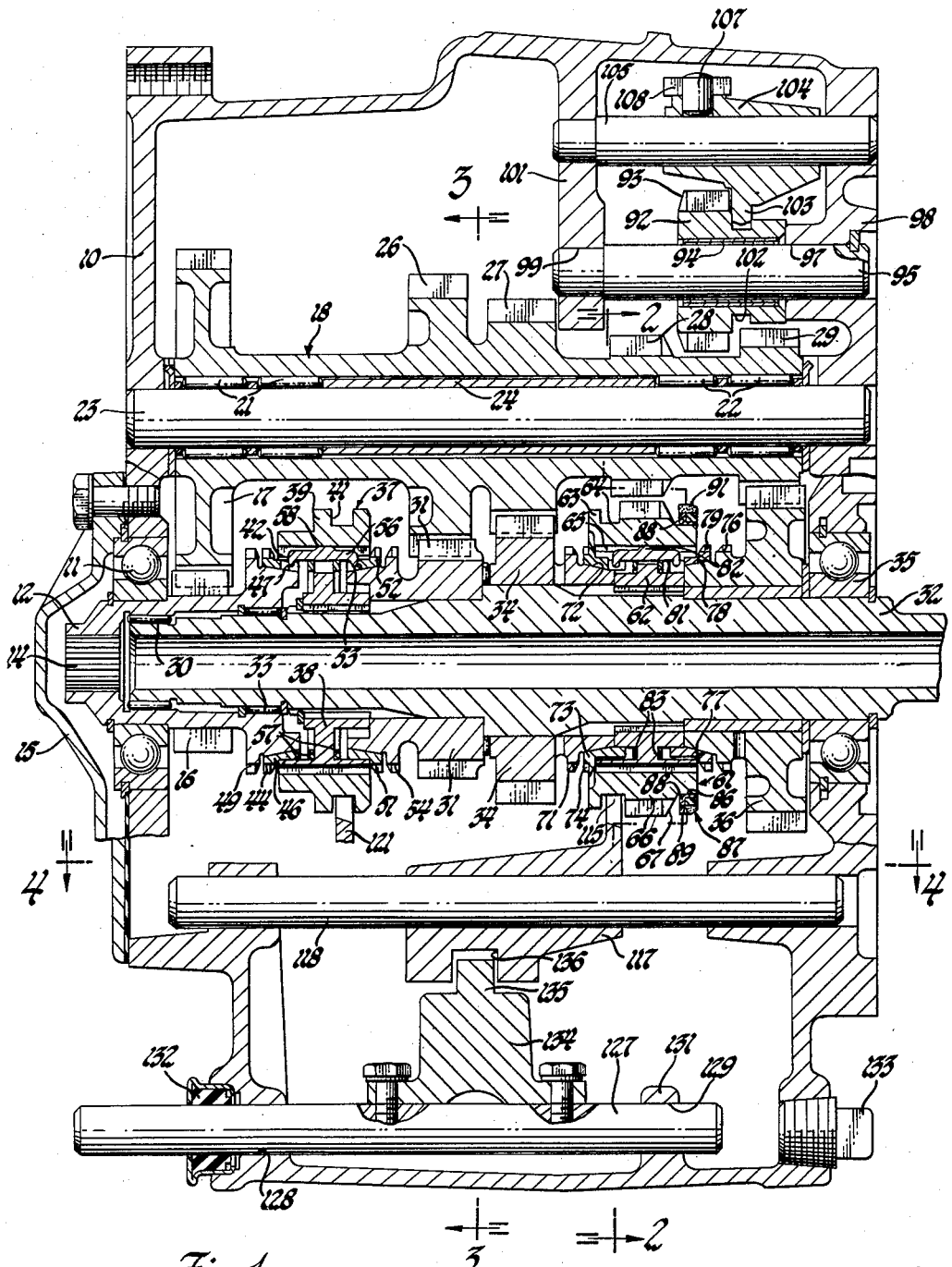
FIGURE 1 is a sectional view of the transmission taken on the line 1—1 of FIGURE 2.

The invention is illustrated in a four speed and reverse counter-shaft type transmission in which the four forward speeds are synchronized. The transmission housing 10 has in one end wall a bearing 11 rotatably supporting the input member 12 which is connected by the splines 14 to the input shaft, not shown, which is inserted in the output sleeve shaft 32. A closure plate 15 is suitably secured to the transmission end wall to seal the aperture in the housing for bearing 11. The input member 12 has an input gear 16 driving the input countershaft gear 17 which is formed as an integral part of the countershaft cluster gear unit 18 rotatably mounted by bearings 21 and 22 on the countershaft 23 and sealed in suitable apertures in the end walls of the housing 10. A spacer sleeve 24 on the support shaft 23 maintains the spacing between the bearings 21 and 22.

The cluster gear 18 has in addition to the input gear 17 a third speed countershaft gear 26, a second speed countershaft gear 27, a reverse countershaft gear 28 and a first speed countershaft gear 29. The third speed countershaft gear 26 meshes with the third output gear 31 rotatably mounted on the output sleeve shaft 32 which is rotatably mounted by needle bearings 30 and 33 on input member 16 and by ball thrust bearing 35 mounted on the other or rear end wall 98 of the transmission housing. The second speed countershaft gear 27 meshes with the second speed output gear 34 which is rotatably mounted on the output shaft 32. The first speed countershaft gear 29 meshes with the first speed output gear 36 rotatably mounted on the output shaft 32.

The third and fourth speed synchronizing unit 37 is located on the output shaft between the third speed output gear 31 and the input gear 16. The synchronizing unit has a hub 38 splined and axially located by a snap ring to the output shaft 32 and a shift collar 39 splined to and axially movable on the external periphery of the hub 38. The collar has on its external periphery an annular groove 41 which cooperates with the shift fork 121 as explained below. The internal splines 42 provide fourth speed and third speed clutch teeth. The fourth ratio balking teeth 44 are on the synchronizing ring or cone 46 which engages the cone surface 47 on the input member 12. The fourth speed clutch teeth 49 are fixed on the input member just beyond the cone surface 47. On a third ratio shift the splines 42 cooperate with the balking teeth 51 on the third speed synchronizing ring or cone 52 which engages the conical surface 53 on the third speed gear 31. The third speed clutch teeth 54 are mounted on the gear member 31 adjacent the conical surface 53. Three key members 56 are held in axial grooves in the hub 38 and collar 39 by a pair of annular spring members 57 and are normally held in the central position shown by the detent 58.

When the collar 39 is moved toward the input member the key 56 is resiliently retained for movement with the collar 39 by the detent 58 and engages the synchronizing cone 46 to urge it into engagement with the surface 47 to cause the collar 39 to rotate at the same speed as the input member 12 for synchronization which permits the spline 42 on the collar to pass through the balking teeth 44 and engage the clutch teeth 49 on input member to engage fourth ratio. Third ratio is similarly engaged by moving the collar to the right so that the key 58 engages the synchronizing cone 52 with the cone surface 53 on the third speed gear 31. When the collar 39 and the gear 31 are rotating at the same speed, the clutch teeth 42 will pass through the balking teeth 51 and engage the clutch teeth 54 on the gear 31 to engage third ratio.

The first-second speed synchronizer 61 is located concentrically on the output shaft 32 between the first speed output gear 36 and the second speed output gear 34. The synchronizing mechanism 61 is similar to the third and fourth synchronizing unit 37 and has a hub 62 splined to the output shaft 32 and a collar 63 splined to the hub 62. The collar has internal splines or teeth 65, an external annular groove 64 which receives the first-second speed clutch fork 115 and an external reverse gear 66 having teeth with tapered leading edges 67. The second speed gear 34 has clutch teeth 71 and a coned surface 72 on which the synchronizing cone 73, having balking teeth 74, is mounted. The first speed gear has clutch teeth 76 and a cone surface 77 on which the synchronizing cone 78, which has balking teeth 79, is mounted. Three keys 81 fitting in grooves in the collar 63 and the hub 62 have a detent 82 engaging the collar 63 which resiliently holds the key and collar together during movement of the collar. The annular spring rings 83 resiliently hold the key in the position shown with the detent in engagement.

When the one-two shift collar 63 is moved to the left, the key 81 is resiliently moved with it due to the action of the detent 82 to apply a limited force to engage the synchronizing cone 73 with the synchronizing surface 72 on second speed gear 34 to synchronize the speed of the collar 63 and gear 34 permtiting the internal splines 65 on the collar 63 to pass through the balking teeth 74 and engage the clutch teeth 71 to connect the output shaft 32 to the second speed gear 34 for second ratio. When the first-second speed clutch collar 63 is moved to the right, the key 81 is moved with it by the detent biasing force to engage the synchronizing cone 78 and moving it into frictional engagement with the cone surface 77 on the first speed gear 36 to synchronize the collar 62 and first speed gear 36. When synchronization is completed, the balking teeth 79 permit internal splines 65 on the collar 63 to pass through to engage the clutch teeth 76 on the first speed gear to establish first speed ratio.

Figure 5:
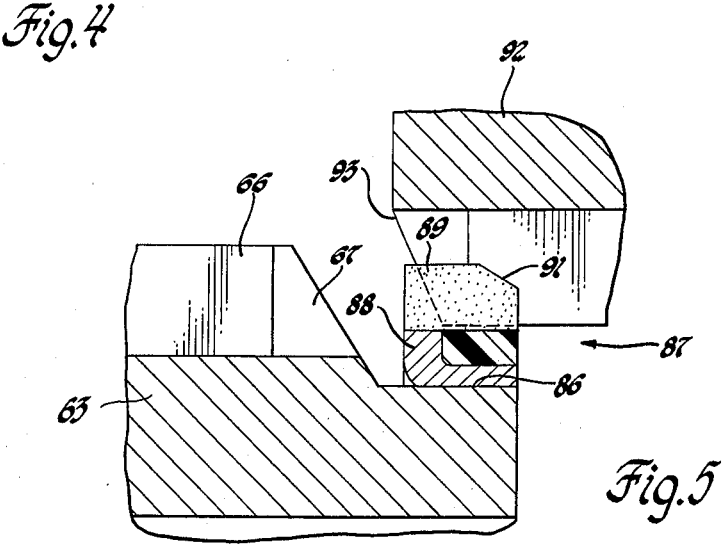
FIGURE 5 is an enlarged partial section taken on line 5—5 of FIGURE 2 showing the damper.

The first-second clutch collar 63 also has a shoulder portion 86 onto which is pressed or otherwise secured thereto a clash preventing damper, generally designated 87. The damper 87 includes a steel ring member 88 and a nonmetallic, such as nylon, Teflon or polyurethane, gear 89, bonded to the steel ring 88. The material used to form the nonmetallic gear 89 must be resilient, resistant to deterioration by petroleum, ozone and ageing and have a high damping capacity. The damper 87 is positioned on the first-second clutch collar 63 so that the center line of the teeth on the nonmetallic gear 89 and the reverse gear 66 are aligned. The tooth profile of the nonmetallic gear 89 is somewhat smaller than the tooth profile of reverse gear 66 and has a tapered leading edge 91 as seen in FIGURES 1 and 5.

The reverse idler gear 92 having teeth with a tapered leading edge 93 is mounted by a bearing 94 on the reverse idler shaft 95. The reverse idler shaft is mounted and keyed in a suitable aperture 97 in the rear wall 98 of the transmission and in a suitable aperture 99 in the support portion 101 extending from the casing and located between the second speed countershaft gear 27 and the reverse countershaft gear 28.

When the transmission is in neutral, as shown in FIGURE 1, or in first speed ratio, that is where the first-second clutch collar is moved to the right, the nonmetallic gear 89 is in mesh with the reverse idler gear 92. Also, in first speed ratio, the reverse gear 66 is in mesh with the reverse idler gear 92. When the transmission is in second speed ratio, the nonmetallic gear 89 is not in mesh with the reverse idler gear 92. Thus during a downshift, from second to first speed ratio, the nonmetallic gear 89 engages the reverse idler gear 92 so that the reverse gear 66 and the first-second speed collar 63 are rotating in unison with the reversed idler 92 so that no gear clash between gears 66 and 92 is possible. The tapered leading edges 67 and 93, of the gears 66 and 92, prevent locking during shifting but they do not prevent metal to metal contact which results in gear clash. It is, therefore, the function of the damper 87 to engage the reverse idler 92 and cause it to rotate at the same speed as the reverse gear 66. The tapered leading edge 91 of the nonmetallic gear 89 prevents locking while the contact of the gears is imperceptible. During the second to first downshift, the reverse idler gear 92 is unloaded and is free to rotate, thus the only load applied to the damper is the inertia of the reverse idler gear 92 and any friction coincidental to the rotation thereof. The nonmetallic gear should have some flexibility to assist in absorbing the inertia load of the reverse idler gear 92. Preferably, the flexibility of the nonmetallic gear is limited so that the relative rotation, between the teeth of the nonmetallic gear 89 and the teeth of the reverse gear 66 which occurs when the nonmetallic gear 89 engages the reverse idler gear 92, is not sufficient to permit the teeth of the reverse gear 66 to become aligned with the teeth of the reverse idler gear 92. The nonmetallic gear 89 is preferably of a plastic composition having a hardness in the durometer range of 55 to 70. This range of hardness will permit the flexibility desired and will not cause the plastic material to be of such a hardness that it will chip or fragmentize during operation.

Figure 2:
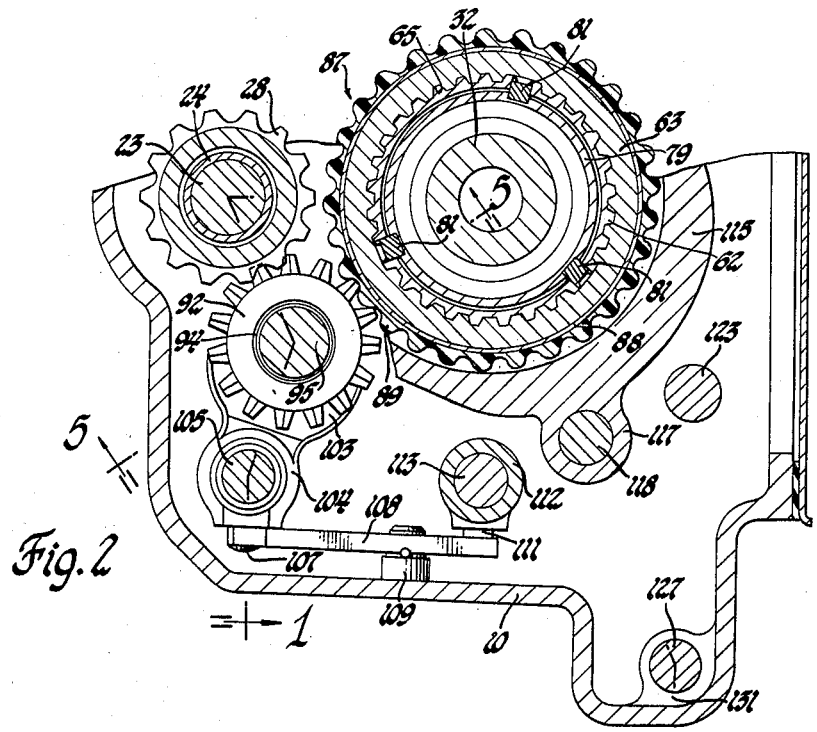
FIGURE 2 is a partial section of FIGURE 1 on the line 2—2.
Figure 3:
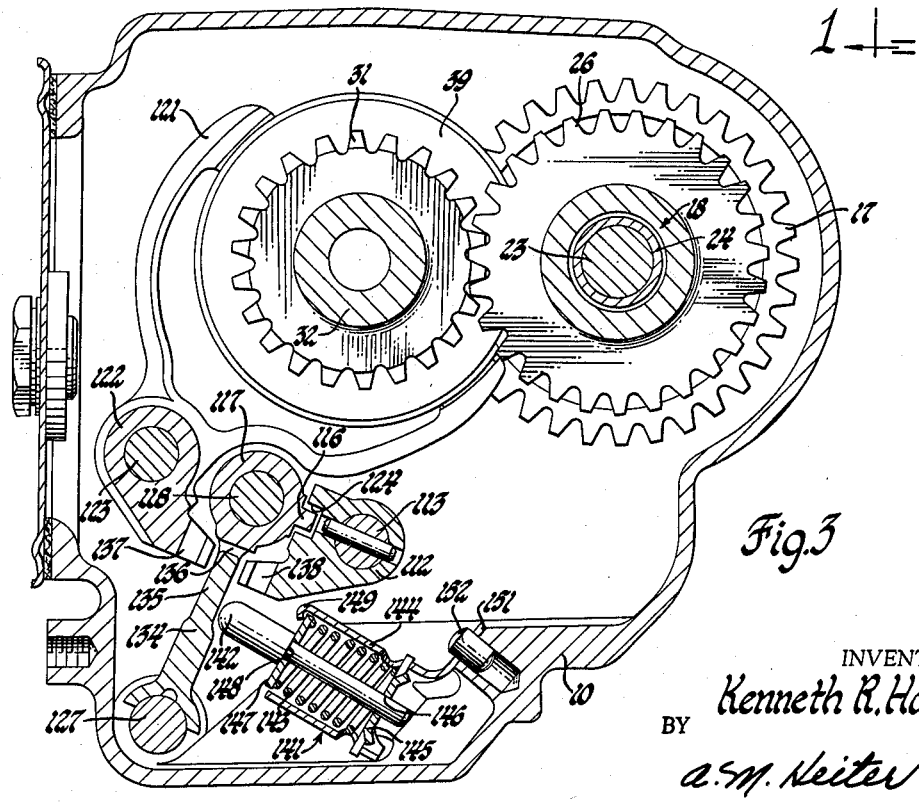
FIGURE 3 is a section of FIGURE 1 on the line 3—3.
Figure 4:
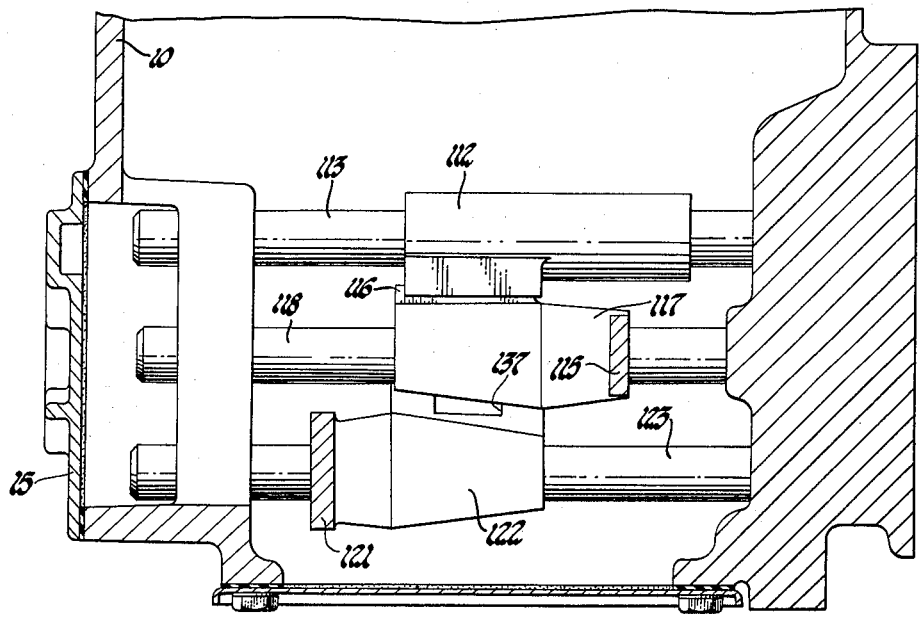
FIGURE 4 is a partial section of FIGURE 1 on line 4—4.

The reverse idler gear 92 has a hub with an annular groove 102 cooperating with the reverse fork 103 which has a guide portion 104 slidably mounted on the support shaft 105 which is secured in suitable apertures in the rear wall 98 and the support portion 101. The guide 104 is connected by a pivot pin 107 to the lever 108 which is pivotally mounted (FIGURE 2) by pivot pin 109 mounted in the bottom of housing 10. The other end of the lever 108 is connected by a pin 111 to the reverse guide 112 which is fixed on the reverse shift rail 113. The first-second shift fork 115 fits in the groove 64 of the first-second shift collar 63 and has integrally formed therewith the guide portion 117 fixed on the first-second shift rail 118. The third-fourth shift fork 121 engages the groove 41 of the third-fourth shift collar 39 and has a guide portion 122 fixed on the third-fourth shift rail 123. The third-fourth ratio fork 121 engages the groove 41 in the collar 39 to prevent rotation of the guide 122 and shift rail 123. The first-second fork 115 similarly prevents rotation of guide 117 and shift rail 118. The guide 117 has a projection 116 fitting an axially extending recess 124 only of sufficient length to permit the necessary reverse shift which prevents rotation of guide 112. The shift control 127 is rotatably and reciprocally mounted in an aperture 128 in the lower forward wall of the transmission housing 10, and in an aperture 129 in a support 131 projecting from the lower wall of the transmission housing. A seal 132 prevents leakage of lubricating oil through the aperture 128 around control rod 127. The drain plug 133 is located at the other end of the bottom of the housing. The control rod 127 has suitably secured thereto an operating lever 134 having an operating tongue 135 normally positioned in a recess 136 in the guide 117 for the first-second shift fork 115. When the lever 134 is rotated by rotary movement of the control rod 127, counterclockwise, as shown in FIGURE 3, the tongue 135 engages the recess 137 in the guide 122 for the third-fourth shift fork 121 to select third or fourth ratios. When the control rod 127 and lever 134 are rotated clockwise, the tongue 135 enters the recess 138 of the reverse guide 112 which is connected through lever 108 to actuate the reverse idler fork 103.

This selecting movement of the lever 134 to select reverse gear is resisted by a reverse inhibitor 141 having a plunger 142 biased to the position shown by a spring 143. Spring 143 is mounted in a generally cylindrical housing 144 having a fixed abutment 145 having a suitable aperture 146 to guide the inhibitor pin 142. The movable abutment 147 is engaged by the spring and urged against the shoulder 148 on the pin 142 to bias the pin into engagement with the lever 134. A stop 149 limits movement of the pin 143 so that it does not tend to move the lever 134 beyond the first-second speed position, shown in FIGURE 3. The inhibitor unit has a support tab 151 secured to the housing 10 by a fastener 152.

Obviously many variations and modifications of the present invention are possible in view of the above teachings.

What is claimed is:

1. A countershaft transmission including, input means; a countershaft; an output shaft; first ratio gear means for providing one drive ratio having a first gear rotatably mounted on said countershaft and drivingly connected to said input means and a second gear freely rotatable on said output shaft and continuously in mesh with said first gear; second ratio gear means for providing a second drive ratio having a first gear rotatably mounted on said countershaft and drivingly connected to said input means and a second gear freely rotatable on said output shaft and continuously in mesh with said first gear; synchronizer means drivingly connected to said output shaft between said second gears of said first ratio and second ratio gear means and slidable thereon between first and second positions for selectively drivingly connecting said second gears to said output shaft; reverse gear means including a reverse drive gear drivingly connected to said input means, a reverse driven gear secured to said synchronizer means and a reverse idler gear rotatably mounted on said reverse idler shaft and slidable thereon for engagement with said reverse drive and driven gears; and damper means including a non-metallic gear member secured to said synchronizer means and movable with said synchronizer means into engagement with said reverse idler gear when said synchronizer means is moved from said second to first position, said reverse driven gear engaging said reverse idler gear after said damper is moved from said second to first position.

2. The invention defined in claim 1 and said synchronizer means having a shoulder portion located between said reverse driven gear and said second gear of said first ratio gear means; and said damper means further including a metal ring member pressed onto said shoulder portion and said non-metallic gear member being bonded to said metal ring member.

3. The invention defined in claim 2 and said non-metallic gear member being of polyurethane composition.

4. A transmission including input means; output means; first gear means drivingly connected to said input means; second gear means drivingly connected to said input means; reverse gear means having a driven gear drivingly connected to said input means, a driven gear drivingly connected to said output means and reverse idler means selectively engageable with said drive and driven gears to operatively connect said input and output means; synchronizer means movable to first and second positions, drivingly connected to said output means and secured to said driven gear, for providing selective drive connection between said first gear means and said output means in said first position and between said second gear means and said output shaft in said second position; and damper means fixed to said synchronizer means, including a non-metallic gear member, for preventing gear clash between said driven gear and said reverse idler gear means when said synchronizer means is moved from said second position to said first position.

5. A transmission including input means; output means; first gear means selectively drivingly connectable between said input and output means; connecting means movable to drivingly connect said first gear means between said input and output means; second gear means, including idler means for selectively drivingly connecting said second gear means between said input and output means and a driven gear secured to said connecting means and output means; and damper means, secured to said connecting means adjacent said driven gear, for preventing gear clash between said driven gear and said idler gear means when said connecting means is moved to drivingly connect said first gear means between said input and output means.

References Cited

UNITED STATES PATENTS

| | | | |
|---|---|---|---|
| 2,307,129 | 1/1943 | Hines et al. | 74—443 X |
| 2,896,760 | 7/1959 | Hebbinghaus | 74—339 X |
| 2,932,992 | 4/1960 | Larsh | 74—443 X |
| 2,993,574 | 7/1961 | Gardner | 74—339 X |

LEONARD H. GERIN, Primary Examiner

U.S. Cl. X.R.

74—443; 192—53, 67

PO-1050
(5/69)

UNITED STATES PATENT OFFICE
CERTIFICATE OF CORRECTION

Patent No. 3,478,615      Dated November 18, 1969

Inventor(s) Kenneth R. Hanchett

It is certified that error appears in the above-identified patent and that said Letters Patent are hereby corrected as shown below:

Column 2, line 20, after "third" insert -- speed -- .

SIGNED AND SEALED
JUN 9 1970

(SEAL)
Attest:

Edward M. Fletcher, Jr.
Attesting Officer

WILLIAM E. SCHUYLER, JR.
Commissioner of Patents